United States Patent Office 3,242,075
Patented Mar. 22, 1966

3,242,075
HIGH TEMPERATURE LUBRICANT
Frank M. Hunter, Port Huron, Mich., assignor to Acheson Industries, Inc., Port Huron, Mich., a corporation of Michigan
No Drawing. Filed Apr. 9, 1962, Ser. No. 185,811
15 Claims. (Cl. 252—22)

The present invention relates to improved oil base lubricant compositions containing graphite which are improved with respect to their ability to lubricate at high temperatures, for example in the range of about 400° F. to about 1300° F. More particularly, this invention relates to improved lubricant compositions and methods of forming adherent lubricating films which are suitable for use as mold coatings in metal casting, in glass blanking molds and for glass handling, pressing, blowing, etc., as lubricants for moving parts operating at elevated temperatures such as the hot moving parts of die casting machines, annealing oven and kiln cars, oven conveyor chains, as lubricants in metal deformation operations such as extruding and the like. The compositions of this invention are especially useful as glass mold coatings.

In the manufacture of glassware articles such as bottles, jars and the like, it is necessary to lubricate the blank mold which receives the molten glass gob for formation of the neck portion of the bottle and the parison, which after transfer to the finishing or blow mold is blown to the final bottle form. The operating temperatures of the blank mold normally are in the range of about 750° F. to 1000° F. but the temperatures of the interior mold surface in contact with the glass gob may reach as high as 1200° F.–1300° F. even when good mold cooling practice is employed. The greatest need for effective lubrication occurs in the blank mold and glass mold lubricants are applied directly to the surfaces contacted by the glass gob which normally has a temperature in the range of 1800° F.–2250° F. Thus, the mold lubricant must contain constituents capable of providing lubrication at such high temperatures. Graphite is satisfactory as a lubricant at such temperatures, and higher, and has been widely employed as the parting agent in glass mold lubricant compositions. In the past, the greatest difficulty in formulating satisfactory high temperature lubricants has occurred in providing a carrier for the graphite which is effective to maintain the graphite in place at the existing high temperatures and under the abrasive action of the hot gob moving over the lubricated surface, and the corrosive conditions which prevail in the mold, i.e., the tendency for oxidation and attack from gaseous decomposition products which may include fluorine. Petroleum base and other oily type carriers have been used in the past and their tendency to vaporize and form smoke has been recognized as an undesirable characteristic. Additionally, the oily materials char at the mold temperatures and tend to build up, particularly around the throat portion and the constricted lower portions of blank molds and such build-up causes roughness, wrinkled or washboard effects on the bottle surfaces, as well as ultimate build-up to an extent which prevents the proper separation and closure of the split molds. Various efforts have been made to overcome these disadvantageous characteristics of such oily carriers, including substitution of water, in whole or in part for the oil, addition of high melting point wetting agents, emulsifying agents, silicas and the like. To date, such attempts to improve the carrier have left much to be desired.

It is the primary object of the present invention to provide an improved composition for use as a high temperature lubricant.

Another object of this invention is to provide a process for lubricating relatively moving parts operating under elevated temperature conditions and a method for coating the surfaces of molds to provide an effective parting layer in metal casting, glass article manufacturing, and the like.

In accordance with this invention, it has been found that an improved high temperature lubricant is formed by employing in admixture, graphite, an oily carrier, a filomer and an anti-oxidant. The compositions may optionally include wax, a linear type olefin polymer and a binder, each of which is discussed in greater detail hereinafter.

As above indicated, in connection with glass mold lubricants, the oxidation products of the petroleum carrier, or char, which is formed by oxidation and volatilization of the petroleum or oily constituent at the mold operating temperatures, i.e., about 400° F.–1300° F., to tend to become packed and to build up on the mold surfaces with continued operation. While a portion of the char is removed by the glass gob moving over the lubricated surface, such abrasive action is insufficient to prevent the gradual build-up of the adherent layer of lubricant decomposition products on the portions of the mold in which there is very little movement of the glass gob, for example, in the neck portion. The improvement which is provided by the present invention is thought to be the result of the modification of the rate and degree of oxidation of the oxidizable constituents in the composition. It has been found that by the addition of the antioxidant constituent to the lubricant composition that the rate of oxidation of the oxidizable constituents is substantially reduced and the life of the lubricating film formed from a given quantity of such a lubricant composition is substantially longer than that obtained from a lubricant composition similar in all respects except that it does not include an antioxidant. The adherent film which holds the graphite particles on the surface is a more tenacious film and both resists dislodgment from the abrasive movement of the glass gob over it, causes the gob to move more easily and uniformly over the mold surface, and yet does not produce decomposition products which tend to pack or build up on the mold surface with continued use and repeated application of the material to the mold surface. The compositions of this invention employ a concentration of graphite which is higher than that heretofore used in comparable compositions and moreover the graphite particle size may be substantially larger than the heretofore recommended and used colloidal graphites that are commercially available.

Generally stated, the improved compositions of this invention may include the constituents, in the proportions indicated which are set forth in Formulation I.

FORMULATION I

| | Range, percent by wt. |
|---|---|
| Antioxidant | 0.5–10 |
| Graphite | 4–10 |
| Oil carrier | 12–65 |
| Linear type olefin polymer | 0–20 |
| Wax | 0–75 |
| Filomer | 1–10 |
| Binder | 0–20 |

A preferred composition is set forth below as Formulation II.

FORMULATION II

| | Range, percent by wt. |
|---|---|
| Antioxidant | 1–5 |
| Graphite | 6–8 |
| Oil carrier | 15–60 |
| Linear type olefin polymer | 2–10 |
| Wax | 5–40 |
| Filomer | 2–8 |
| Binder | 2–15 |

The particular type of oil carrier which is suitable for the purposes of this invention has not been found to be critical. Satisfactory results are obtained from mineral oils, hydrocarbon oils derived from other sources or animals oils such as lard and sperm oil, oils of vegetable origin such as rapeseed oil, linseed oil, etc. The oils derived from petroleum refining constitute the preferred oil carrier, and to date oils resulting from the refining of various types of crude petroleums designated commercially naphthenic, paraffinic or aromatic crude petroleums or blends thereof are satisfactory.

As above explained, it is undesirable to employ an oil carrier which produces a substantial quantity of ash in the temperature range of 400° F.–1300° F. Other than the low ash forming characteristic the oil to be used may be selected on the basis of the desired final viscosity or consistency of the lubricant. For most purposes, ordinary lubricating grade oil is satisfactory and is preferred for reasons of economy. In the event it is desired to form a lubricant for application to mold surfaces by spraying, or atomizing, the compositions of this invention may be diluted with an oil of the same type used in the original formulation, or other compatible oil.

The graphite constituent may be of natural or electric furnace origin and should be one of low ash content, for example, less than about 2%. The particle size of the graphite may vary widely in the range between about 0.5–75 microns but somewhat better results are obtained when the particle size is maintained in the range of average particle size of about 10 to about 40 microns, which is higher than the size range of the material commercially designated "colloidal graphite."

The linear type olefin polymer functions to control the flow out or spreading of the formulation when it is applied to the hot mold surface. It functions to reduce the tendency of the oil carrier to spread on the surface and provides for more even distribution of the material during the time that the oil carrier is volatilizing or beginning its charring on the surface. Suitable linear type olefin polymers are those having a molecular weight above 1,000 and as high as about 200,000 and preferably a molecular weight in the range between about 30,000 and 80,000, such as polyisobutylene. Such a polyisobutylene material may be made in accordance with known commercial procedures, such as polymerization below about minus 10° C. in the presence of a boron fluoride catalyst and an inert solvent such as liquified propane. As indicated above in Formulation I, the linear type olefin polymer is not essential, but its presence in the preferred quantities of about 2% to about 10% by weight of the composition provides improved flow-out characteristics. By varying the proportion within this preferred range, it is possible to control the flow-out rate of the lubricant material and to assure uniform graphite particle distribution for various mold temperatures. By employing a high concentration of the wax and petrolatum constituents, it is possible to avoid the necessity to control the flow-out characteristics with the linear type olefin polymer, but, particularly for the higher mold operating temperatures, the presence of the linear type olefin polymer is preferred.

The wax constituent of the compositions of this invention, for a given oil carrier concentration, functions to control the viscosity or consistency of the formulation, and enables the variation of the consistency from that of the oil carrier consistency up to relatively thick greases. The type of wax which is satisfactory for this purpose is not critical and may be a wax derived from petroleum, animal or vegetable bases, or may be a synthetic wax or a blend of any or all of these. The type of wax and the amount of wax which is chosen, within the ranges that are broadly set forth in Formulation I, depend upon the consistency desired for the particular application. When relatively thick grease-like formulations are desired, a hard, or high melting point wax, in substantial propor- tion is needed. When the final desired consistency is that of a medium heavy grease such as 90W S.A.E., the quantity of hard wax is reduced and the type which is chosen is one of the soft to medium hard waxes such as the petrolatum waxes.

Specifically suitable waxes include microcrystalline wax, paraffine waxes, carnauba wax, palm wax, montan, beeswax, spermaceti and the synthetic waxes such as cetyl acetamide. In the usual case, it is desirable to employ a mixture of waxes, such as a mixture of microcrystalline wax and petrolatum. The ultimate viscosity can be readily controlled by simply varying the relative quantities of the hard wax constituent, for example microcrystalline wax, and the soft wax constituent, such as petrolatum. Excellent results have been obtained from the use of approximately equal quantities of petrolatum and microcrystalline or other hard wax, and good results are obtained when the proportion of petrolatum constitutes between about 30% and about 70% of the total wax constituent. As above indicated in Formulation I, satisfactory compositions are produced in the complete absence of the wax constituent, and it is to be understood that the hard wax or soft wax constituents may be absent or either may constitute the entire quantity of the wax which is present.

As above generally indicated, the antioxidant component functions to modify or control the thermodecomposition or break-down of the hydrocarbon constituents of the composition in such a way that the adhesion of the coating is increased and the rate of breakdown of the charred film is greatly decreased. The oxidation or corrosive attack of the film which holds the graphite particles in place is controlled so that the coating remains substantially non-porous and thus protective to the surface throughout its slow decomposition and removal from the surface. Moreover, the antioxidant appears to effect a decrease in the final hardness of the varnish-like film which is formed on extended use and after repeated application, so that any ultimate build-up is easily removed by moderate mechanical abrasion, ordinarily at the location of use of the mold, by, for example, wire brushing, or the like. The type of antioxidant which is suitable does not appear to be critical and based on the experimental evidence at hand it appears that any of the known antioxidants, when used in the proportion specified in Formulation I, functions satisfactorily to accomplish the above objectives. Exemplary types of antioxidants which are suitable for this purpose include sulphur compounds, for example, the sulfurized fatty esters including specifically, sulfurized sperm oil, lard oil, tallow, corn oil, methyl oleate, etc.; the sulfurized terpenes, including specifically sulfurized polybutenes, sulfurized dipentene, sulfurized pinene; the sulfurized paraffin wax olefins, including specifically those having a carbon chain length of about 18–25 carbon atoms; the aromatic sulfides including specifically dibenzyl sulfide, dixylyl sulfide, diactyl sulfide, naphthalene thiol, thio diphenylamine, the alkyl sulfides, including specifically dicetyl sulfide, dilauryl thiodipropionate; the alkyl phenol sulfides, including specifically dibutyl phenol sulfide, 2,2- thio bis (4-methyl-6-tert-butyl phenol), diamylphenol sulfide, para-tertiary butyl phenol sulfide; the dithiocarbamates, including specifically zinc diamyl dithiocarbamate, zinc dibutyl dithiocarbamate, sodium dibutyl dithiocarbamate, zinc methyl octyl dithiocarbamate, zinc dicetyl dithiocarbamate, cadmium dibutyl dithiocarbamate, lead dibutyl dithiocarbamate, zinc diethyl dithiocarbamate. The phosphorous containing antioxidants, which are useful include the alkyl phosphates such as zinc stearyl phosphate, calcium cetyl phosphate; the organic phosphites such as triphenyl phosphite, dibutyl phosphite, tributyl phosphite. Antioxidants containing both sulfur and phosphorous which are effective include the dithiophosphates such as zinc dithio dioctyl phosphate, zinc dithio dibutylphenol phosphate; the condensation products of phosphorous, pentasulfide with unsaturated terpenes, or paraffin olefins or fatty acid esters, including specifically the reaction products of phosphorous pentasulfide and polybutene. The phenol derivative type of antioxidants which are effective include butylated hydroxy toluene, 2,6-di-tertiary butyl phenol, hydroquinone, alizarin, pyrogallol, ortho-tertiary-butyl phenol, 2,6-dimethyl phenol, 2,2-methylene bis (4-methyl-6-tert-butyl phenol), 4-4-methylene bis (2,6-di-tertiary butyl phenol), 4-hydroxy-diphenyl, tert-butyl hydroxy-anisole, 2,6-di-tertiary-butyl-alpha-dimethyl-amino-para-cresol, the oil soluble amines, such as tetramethyl diaminodiphenylmethane, phenyl naphthylamine, diphenylamine; N,N'-diphenyl-p-phenylene diamine and the phenolic amines such as dibutyl dimethylamine para cresol, alpha and beta amino-phenols, N,N'-diphenylethylene diamine may also be used. The antioxidant may be a single compound of one of the above types, or may be a combination of one or more of them. When more than one antioxidant is used the quantity is preferably within the above given range. The preferred antioxidants are the zinc alkyl di thio carbamates, the zinc alkyl or zinc aryl dithiophosphates and the phenol derivatives such as butylated hydroxy toluene.

The constituent designated filomer in Formulation I refers to a film-forming polymer which functions to provide a skin or film on the mold surface as the oxidizable components of the formulation volatilize or flash from it when it is applied to the hot mold surface, and to assist in maintaining the graphite particles in place. As used in this specification and in the appended claims, the expression "filomer" is intended to mean a film-forming polymer and to include the isoprene polymers, natural and synthetic, and depolymerized rubber, having a viscosity in the range of about 12,000 to about 65,000 cps., Brookfield at 150° F., polysulfides, styrene-butadiene rubbers butadiene-acrylonitrile rubbers, polyurethane rubbers, and copolymers of isobutylene and olefins, commonly known as the butyl rubbers. The preferred filomer for the purposes of this invention is a depolymerized rubber of medium viscosity.

As indicated above in Formulation I, the compositions of this invention may include a binder, and in its preferred form a binder is present. The binder functions cooperatively with the filomer to control the adhesion of the film to the surface, and when the filomer concentration approaches its lower limit it is desirable to have binder in the composition. When, however, the filomer approaches its upper limit, the composition has satisfactory adherence to enable its satisfactory use in the complete absence of the binder. The binder which has given the best results is a petroleum sulfonate. More specifically, the binder is a Twitchell base type of petroleum sulfonate, understood to be the sodium salt of a petroleum sulfonate. Good results have been obtained with such a Twitchell base petroleum sulfonate having a viscosity on the Gardner-Holdt scale of Z4 to Z6, a moisture content of 4%–6% by weight, and a specific gravity of 0.99, which petroleum sulfonate is clear at room temperature and also is clear at a 20% concentration in a paraffin oil.

Compositions of this invention are made by merely blending together the above described materials in the quantities indicated in Formulations I or II, and such blending is satisfactorily accomplished in an ordinary commercial type propeller blade mixer. Since the composition may include waxes which are hard at room temperature, it is desirable to mix the ingredients at temperature above the melting point of the wax, for example, at least about 140° F and the temperature may go up to about 300° F.

All quantities referred to in the following examples are expressed in percent by weight unless otherwise specifically indicated.

*Example I*

A lubricant was blended by mixing in a 20-gallon kettle the following materials:

| | Percent |
|---|---|
| Oil carrier [1] | 58.9 |
| Filomer (depolymerized rubber, medium viscosity) | 5 |
| Graphite (approximately average particle size 20 microns) | 8 |
| Binder [2] | 10 |

[1] Blended semi-refined mineral oil viscosity of 75, SSU at 210° F.; approximately 30% paraffinic, 20% naphthenic, and 50% aromatic hydrocarbons.
[2] Sodium petroleum sulfonate—Twitchell Base #8955, viscosity Z4–Z6, Gardner-Holdt, specific gravity 0.99, moisture content 4%–6%.

These materials were blended with a propeller type mixer until uniformly blended. To the above blended materials 18 percent of wax, heated to 300° F. was added and blended until the entire mixture was uniform. The wax was a blend of approximately 50% petrolatum and 50% microcrystalline wax having a melting point of 150° F.–152° F., commercially designated Enarco Processing Wax, Q–1374–E, National Refining Company. The blended material was then removed from the kettle, poured into containers and cooled to room temperature. The cooled material was observed to be a smooth, black grease-like material, having the consistency of firm jelly.

The above composition was used as the swabbing compound in the operation of a Hartford I. S. glass bottle molding machine commercially forming ⅘ quart capacity amber glass bottles.

The molds operated at a temperature of about 750°–1000° F. and the material was applied by swabbing to the blank mold. With the machine operating at a production rate of 30–50 bottles per minute, the machine produced bottles free of material pick-up, skin roughness or the like with the blank mold being swabbed at approximately 15 minute intervals. At the end of 36 hours of operation, the blank mold exhibited a noticeable quantity of build-up of the lubricant film in the neck-ring portion which was hard and could not be removed by wire brushing. At the end of 48 hours, the film in the neck-ring portion had built up to the degree which necessitated the removal of the mold from the machine for removal of the film by vigorous cleaning and dressing in the mold house.

*Example II*

A lubricant composition was prepared using the procedures above described in Example I having the following composition:

| | Percent |
|---|---|
| Oil carrier [1] | 57 |
| Graphite (approximate average particle size 20 microns) | 7 |
| Filomer (depolymerized rubber, medium viscosity) | 8 |
| Linear type olefin polymer (polyisobutylene) [2] | 2 |
| Wax (50–50 blend of petrolatum-microcrystalline wax) | 16 |
| Binder [3] | 6 |
| Antioxidant (zinc di thio phosphate, Aerolube 93–C, American Cyanamid Co.) | 4 |

[1] Blended semi-refined mineral oil, viscosity of 75, SSU at 210° F.; approximately 30% paraffinic, 20% naphthenic, and 50% aromatic hydrocarbons.
[2] Caloria #40 M—Humble Oil & Refining Company.
[3] Sodium petroleum sulfonate—Twitchell Base #8955, viscosity Z4–Z6, Gardner-Holdt, specific gravity 0.99, moisture content 4%–6%.

The above composition was employed as the swabbing compound for the blank mold on the same production glass bottle machine described above in Example I. In continuous production under similar operating conditions, it was found to be necessary to swab the blank mold only on the average of once every half hour. During production, any film which was formed was easily removed by hand wire brushing at the bottle forming machine. At the end of 64 hours, an inspection of the neck portion of the blank mold showed no discernible build-up film, and the machine was producing high quality bottles at the increased rate of acceptable quality of 3–4 more bottles per hundred than was obtained from the use of the lubricant composition of Example I.

*Example III*

A lubricant composition was prepared identical to the formula described above in Example II, except that the antioxidant employed was butylated hydroxy toluene, commercially designated Ionol–CP, Shell Chemical Corporation.

This composition operated in substantially similar fashion to that described above in Example II.

*Example IV*

A lubricant composition was built up to the same formula as that described above in Example II, except that the antioxidant was zinc diamyldithiocarbamate. The antioxidant was added as a 50% solution in oil and is commercially designated Amyl Ziram and available from Pennsalt Chemicals Corporation.

This composition operated in substantially similar fashion to that described above in Example II.

What is claimed is:

1. A lubricant composition for use at temperatures in the range of about 400° F. to about 1300° F. which comprises in weight percent about 12% to about 65% oil carrier, about 4% to about 10% graphite, about 1% to about 10% filomer and about 0.5% to about 10% of an antioxidant.

2. A lubricant composition as claimed in claim 1, wherein said graphite has an average approximate particle size of about 10 to about 40 microns.

3. A lubricant composition as claimed in claim 1, wherein said filomer is depolymerized rubber.

4. A high temperature lubricant composition comprising in weight percent about 12% to about 65% oil carrier, about 4% to about 10% graphite, about 1% to about 10% filomer selected from the group consisting of isoprene polymers, depolymerized rubber having a viscosity in the range of about 12,000 to about 65,000 cps., polysulfides, styrene-butadiene rubbers, butadiene-acrylonitrile rubbers, polyurethane rubbers and butyl rubbers, about 0.5% to about 10% of an antioxidant, up to about 20% of a linear type olefin polymer having a molecular weight in the range of 1000 to about 200,000, up to about 75% wax, and up to about 20% Twitchell base petroleum sulfonate.

5. A high temperature lubricant composition as claimed in claim 4, wherein said olefin polymer is polyisobutylene, and said anti-oxidant is selected from the group consisting of zinc alkyl dithiocarbamates, zinc alkyl dithiophosphates, zinc aryl dithiophosphates and phenol derivatives.

6. A lubricant composition for use at temperatures in the range of about 400° F. to about 1300° F. which comprises in weight percent about 15 to about 60% oil carrier, about 6% to about 8% graphite, about 2% to about 8% filomer selected from the group consisting of isoprene polymers, depolymerized rubber having a viscosity in the range of about 12,000 to about 65,000 cps., polysulfides, styrene-butadiene rubbers, butadiene-acrylonitrile rubbers, polyurethane rubbers and butyl rubbers and about 1% to about 5% of an antioxidant.

7. A lubricating composition as claimed in claim 6, wherein the said graphite has an average approximate particle size of about 10 to about 40 microns.

8. A lubricant composition as claimed in claim 6, wherein said filomer is depolymerized rubber.

9. A high temperature lubricant composition comprising in weight percent about 15 to about 60% oil carrier, about 6% to about 8% graphite, about 2% to about 8% filomer selected from the group consisting of isoprene polymers, depolymerized rubber having a viscosity in the range of about 12,000 to about 65,000 cps., polysulfides, styrene-butadiene rubbers, butadiene-acrylonitrile rubbers, polyurethane rubbers and butyl rubbers and about 1% to about 5% of an antioxidant, and about 2% to about 10% of a linear type olefin polymer having a molecular weight in the range of about 1000 to 200,000, about 5% to about 40% wax, and about 2% to about 15% Twitchell base petroleum sulfonate.

10. A high temperature lubricating composition as claimed in claim 9, wherein said olefin polymer is polyisobutylene, and said anti-oxidant is selected from the group consisting of zinc alkyl dithiocarbamates, zinc alkyl dithiophosphates, zinc aryl dithiophosphates and phenol derivatives.

11. A method for forming a high temperature lubricant coating on a substrate surface which comprises applying to said surface a composition comprising in weight percent about 12% to about 65% oil carrier, about 4% to about 10% graphite, about 1% to about 10% filomer and about 0.5 to about 10% of an antioxidant.

12. A method for forming a high temperature lubricating composition on a substrate surface which comprises applying to said surface a lubricant composition comprising in weight percent about 15 to about 60% oil carrier, about 6% to about 8% graphite, about 2% to about 8% filomer selected from the group consisting of isoprene polymers, depolymerized rubber having a viscosity in the range of about 12,000 to about 65,000 cps., polysulfides, styrene-butadiene rubbers, butadiene-acrylonitrile rubbers, polyurethane rubbers and butyl rubbers and about 1% to about 5% of an antioxidant.

13. A method for forming a high temperature lubricating composition on a substrate surface which comprises applying to said surface a lubricant composition comprising in weight percent about 15 to about 60% oil carrier, about 6% to about 8% graphite, about 2% to about 8% filomer selected from the group consisting of isoprene polymers, depolymerized rubber having a viscosity in the range of about 12,000 to about 65,000 cps., polysulfides, styrene-butadiene rubbers, butadiene-acrylonitrile rubbers, polyurethane rubbers and butyl rubbers, about 1% to about 5% of an antioxidant, and about 2% to about 10% of a linear type olefin polymer having a molecular weight in the range of about 1000 to 200,000, about 5% to about 40% wax, and about 2% to about 15% Twitchell base petroleum sulfonate.

14. A method for forming a high temperature lubricant coating on a substrate surface which comprises applying to said surface a composition comprising in weight percent about 12% to about 65% oil carrier, about 4% to about 10% graphite, about 1% to about 10% filomer selected from the group consisting of isoprene polymers, depolymerized rubber having a viscosity in the range of about 12,000 to about 65,000 cps., polysulfides, styrene-butadiene rubbers, butadiene-acrylonitrile rubbers, polyurethane rubbers and butyl rubbers, about 0.5 to about 10% of an antioxidant, and thereafter subjecting said coating to a temperature in the range of about 400° F. to about 1300° F.

15. A method for forming a high temperature lubricant coating on a substrate surface which comprises applying to said surface a composition comprising in weight percent about 12% to about 65% oil carrier, about 4% to about 10% graphite, about 1% to about 10% filomer selected from the group consisting of isoprene polymers, depolymerized rubber having a viscosity in the range of about 12,000 to about 65,000 cps., polysulfides, styrene-butadiene rubbers, butadiene-acrylonitrile rubbers, polyurethane rubbers and butyl rubbers, and about 0.5 to about 10% of an antioxidant, said substrate at the time of application of said coating composition thereto having a temperature in the range of about 400° F. to about 1300° F.

(References on following page)

References Cited by the Examiner

UNITED STATES PATENTS

| | | | |
|---|---|---|---|
| 2,322,242 | 6/1943 | Lanigan et al. | 117—133 |
| 2,358,290 | 9/1944 | Kraft | 260—33.6 |
| 2,487,260 | 11/1949 | Morway | 252—22 |
| 2,754,266 | 7/1956 | Stegemeier et al. | 252—22 |
| 2,864,882 | 12/1958 | Snell | 260—33.6 |
| 2,926,138 | 2/1960 | Huet | 252—30 |
| 2,970,927 | 2/1961 | David | 252—30 |

FOREIGN PATENTS 823,357 11/1959 Great Britain.

OTHER REFERENCES

Manufacture and Application of Lubricating Greases: by Boner, Reinhold Pub. Corp., New York, 1954, pages 325–326.

DANIEL E. WYMAN, *Primary Examiner.*

JOSEPH R. LIBERMAN, *Examiner.*